Figure 1:
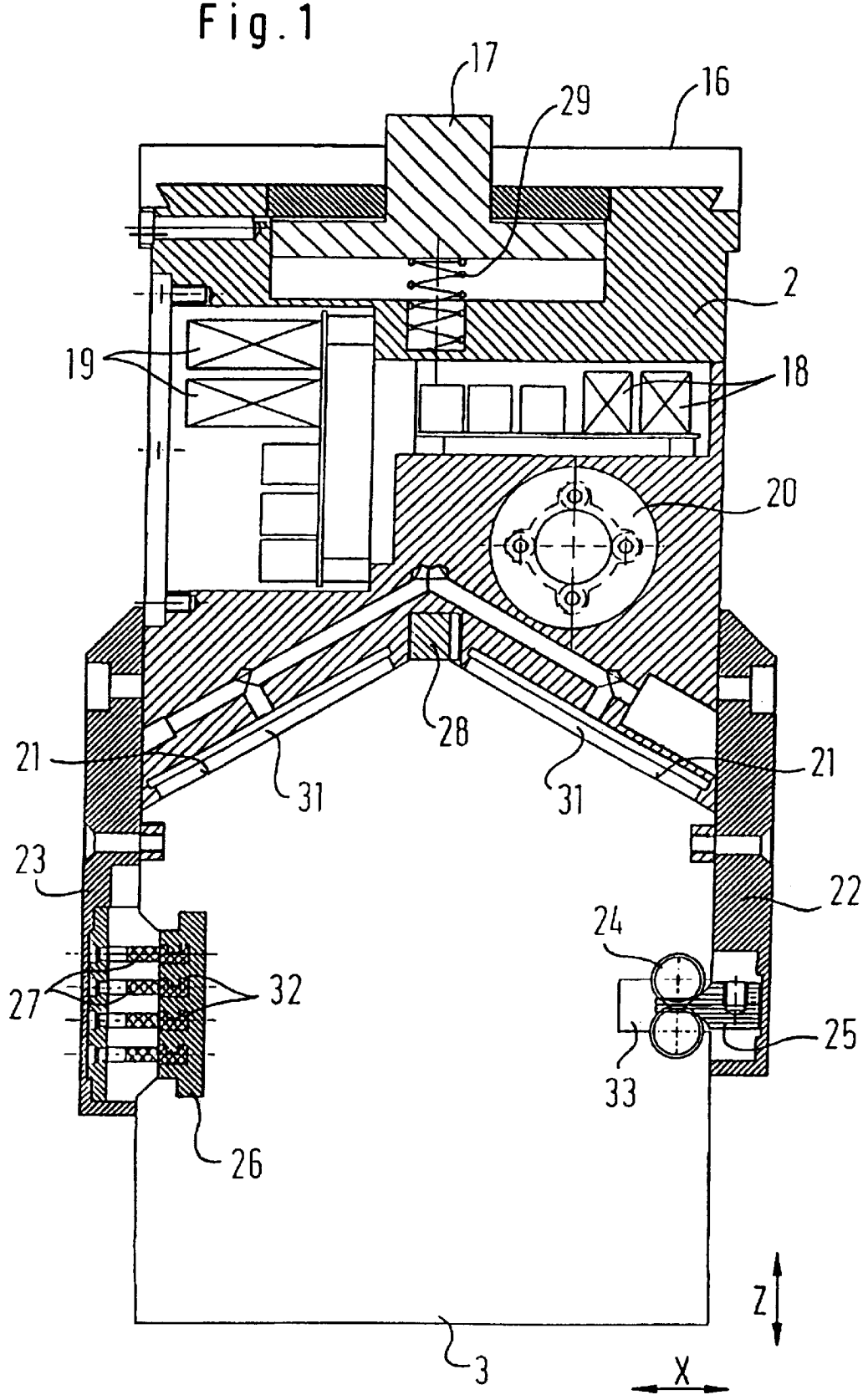

United States Patent
Gauss et al.

[11] Patent Number: 6,129,027
[45] Date of Patent: Oct. 10, 2000

[54] PROCESSING MACHINE

[75] Inventors: Achim Gauss, Hallwangen; Karl Frey, Schopfloch; Kurt Kalmbach, Alpirsbach, all of Germany

[73] Assignee: Shomag Maschinenbau AG, Schopeloch, Germany

[21] Appl. No.: 09/244,873

[22] Filed: Feb. 5, 1999

Related U.S. Application Data

[63] Continuation of application No. PCT/EP97/04237, Aug. 4, 1997.

[30] Foreign Application Priority Data

Aug. 5, 1996 [DE] Germany ............................ 196 31 661

[51] Int. Cl.[7] .................................................... A63G 21/00
[52] U.S. Cl. .............................. 104/134; 104/135; 104/89
[58] Field of Search ..................................... 104/134, 139; 105/29.1; 191/12 R

[56] References Cited

U.S. PATENT DOCUMENTS

| | | |
|---|---|---|
| 4,723,766 | 2/1988 | Beeding . |
| 4,836,111 | 6/1989 | Kaufmann ................... 104/89 |
| 4,885,996 | 12/1989 | Hirschmann . |
| 5,924,365 | 7/1999 | Pircher ................... 105/29.1 |

FOREIGN PATENT DOCUMENTS

| | | |
|---|---|---|
| 307645 | 3/1989 | European Pat. Off. . |
| 687521 | 12/1995 | European Pat. Off. . |
| 3629367 | 3/1988 | Germany . |
| 3826830 | 4/1989 | Germany . |
| 3818647 | 12/1989 | Germany . |
| 3812857 | 10/1990 | Germany . |
| 3910381 | 10/1990 | Germany . |
| 4010840 | 10/1991 | Germany . |
| 4110344 | 10/1991 | Germany . |
| 4404413 | 1/1995 | Germany . |
| 94 19 700 U1 | 3/1995 | Germany ................... B27C 5/064 |
| 3906300 | 8/1999 | Germany . |

*Primary Examiner*—Stephen Avila
*Attorney, Agent, or Firm*—Fitch, Even, Tabin & Flannery

[57] ABSTRACT

This invention concerns a processing machine, particularly for panel-shaped workpieces of wood or wood materials, which consists of: one or more processing stations which essentially lie in the same plane; at least one working unit which can travel over the work stations in three axes perpendicular to one another, and, a number of bearing rails upon which the displaceable carriage units are arranged in the plane of the work stations. The bearing rails have electrical and pneumatic supply interfaces for the carriage units and the supply interfaces are arranged linearly along the longitudinal direction of the bearing rail.

12 Claims, 2 Drawing Sheets

PROCESSING MACHINE

This application is a continuation of PCT/EP97/04237 filed Aug. 4, 1997.

The invention concerns a processing machine for processing panel shaped workpieces.

Such processing machines, which are also described as processing centres, are used for the processing, in particular, of panel-shaped workpieces of wood, plastic, layered or composite substances. At the least, such a processing centre has one, but frequently two or more, processing positions. Above the processing positions, at least one processing unit can be moved in three axes which are perpendicular to each other, i.e. in the X, Y, and Z axial directions. The processing unit has at least one spindle unit for the accommodation of processing tools, processing aggregates, handling aggregates etc. By using such processing centres, a plurality of processing steps is carried out one after another, such as e.g. drilling, milling or measuring processes.

For the chucking of the workpieces which are to be processed respectively at the processing station, conventional processing centres are also equipped with support rails, on which carriage units in the form of displaceable vacuum suction heads are arranged. Such vacuum suction heads are arranged on support rails and form a suction tension device, on which the workpieces are firmly held during their processing by means of vacuum suction. In this connection, in addition to the movability of the vaccum suction heads (hereafter described simply as "suction heads"), as a rule, the support rails themselves are movable in the transverse direction to their longitudinal axes.

For example, in German utility model DE 94 19 700.8 U1, a processing machine of this generic class is described in which, in addition to the drivable processing unit, a separate, independently movable extension arm is provided, which is responsible for positioning the suction head. By means of a carrier device, which can be brought into engagement with a carriage unit to be positioned, the separate extension arm moves the suction head along the support rail into a desired position. In another embodiment the suction heads have their own drive, to move the heads. As one example of such a drive, a linear motor is suggested.

The supply of the suction heads on the support rails has been carried out until now by trail hoses and trail cables. Each suction head is individually connected to such trail hoses and cables, in order e.g. to supply them with vacuum, so that the suction head can fix a positioned workpiece by vacuum suction. When the suction head is moved into a new position on the support rail, the suction hoses and cables migrate with it correspondingly. In the case of a plurality of suction heads on a support rail or adjacent support rails, care must therefore be taken that the supply lines for the individual suction heads do not come into conflict with each other. Thereby the suction positioning is complicated, because possible mutual impediments of the suction heads with their supply lines have to be taken into consideration. However, the programming of the processing of the workpiece is also complicated, because corresponding collision corridors have to be taken into consideration, in order to avoid a collision between the processing unit and the supply lines of the suction heads. In addition, such trail supply lines are comparatively costly and there is always the danger that these lines may be damaged and that therefore the functional capacity of the suction heads will be adversely affected on the support rails.

From DE 38 26 830, a linear transfer device for workpiece carriers is known which can be installed in various successive work stations, in order to process workpieces in the various stations and/or to transfer workpieces to be assembled from one station to another. The linear transfer devices have a guide rail, on which power supply segments are formed linearly. Equally a drive segment is provided on the guide rail. On this rail, a carriage moves which is equipped with its own drive motor and drives a drive roller, which abuts the drive segment of the guide rail. The power supply segments on the guide rail are taken up by means of slip contacts on the carriages. Therefore the drive motor is provided with current via the power supply segments. It is also disclosed that the drive motor can be designed as a servo motor and can be controlled via the control lines which run in the guide rail.

DE A 39 06 300 discloses a guide device for a transportable machine tool (circular saw), which has a dust extraction channel, which is provided with a longitudinally slit channel wall with a sealing made of flexible material. A mouthpiece which cooperates in the feed movement of the machine tool is inserted in this flexible sealing material.

Therefore the invention is based on the technical problem of creating a processing machine in which the supply of carriage units is carried out more compactly and better ordered and, in addition, the carriage units can be driven individually and are controllable.

In the solution of the problem in accordance with the described and claimed embodiments, the support rails have respectively electrical and pneumatic supply interfaces for the carriage units. The supply interfaces extend linearly along the longitudinal route of the support rail.

In this way, the carriage units, which are located on the support rail, can pick up the necessary electrical energy and electronic information/signals as well as the necessary supply with vacuum and compressed air and/or with other fluids, in their respective position directly on the support rail. Therefore all the trail hoses and trail cables, which were until now supplied to each individual carriage unit, can be omitted, because the supply strands for the carriage units are now integrated in the support rails. Therefore the result is an extremely compact, integral solution for the supply problem of the movable carriage units. Because the supply strands are firmly integrated in the support rails, they are much better protected against damage than the trail hoses and cables which were formerly used, and the supply strands no longer have to be moved together with the movement of the carriage units. In the solution in accordance with the invention, there are no longer any supply lines in the zones between the support rails and the carriage units, and the supply strands can no longer mutually obstruct each other. The result is a clearly structured supply of the carriage units which is easily observed, without components which are susceptible and guided freely. In accordance with the invention a linear multifunction interface is therefore created on the support rail, by means of which the carriage units positioned on the support rail can be supplied at any desired point along the carrier rail.

Due to the solution in accordance with the invention, the positioning of carriage units on the support rails is greatly simplified. Because no more regard has to be taken to the supply lines, the carriage units can be positioned at discretion close to each other, and thus a larger number of carriage units can be placed on the support rails than in the past. In addition, in the solution in accordance with the invention the programming of the workpiece processing is substantially simplified, because only the carriage units themselves have to be taken into consideration with respect to the danger of collision, but not the supply lines exiting from the carriage units, which only have access with difficulty to programming which prevents collision.

In accordance with the disclosed embodiments of the invention, the support rails can be both straight as well as curved in their longitudinal extension. The rail routes, along which the carriage units are moved, can also be both straight route segments as well as curves. The supply interfaces in accordance with the disclosed embodiments of the invention, which extend linearly along the longitudinal extension of the support rail, in the event of curved support rails, naturally follow the course of the support rail.

The present solution can be used for the most varied types of carriage units. By a carriage unit what is meant is carriages, wagons, panel shapes, supports or the like, which are movavble on and/or at the support rail and, if necessary, can comprise and/or support different aggregates. The carriage units can comprise workpiece clamping aggregates. In particular, they can be designed as vacuum suction heads, but they can also comprise other clamping aggregates, e.g. mechanical clamping aggregates. In addition, the carriage units can be designed as workpiece transport aggregates as well as workpiece handling aggregates. They can, in particular, be designed as gripper aggregates or transport aggregates. Furthermore, the carriage units can be tool carrier aggregates as well as workpiece processing aggregates. Such aggregates can also carry out processing operations on the workpiece, and in fact in addition to the processing unit of the processing machine. Such carriage units, which carry the processing tools and/or processing aggregates, can e.g. be used for the independent drilling of holes in the clamped workpiece, for the insertion of dowels in corresponding bores on the workpiece as well as for a plurality of other processing steps.

In a preferred embodiment of the invention, the electrical supply interfaces of the support rails are designed in the form of slip ring rails. The slip ring rails interact with corresponding slip contacts of the carriage units. In this context, a plurality of individual slip ring rails can be designed, which transfer respectively various energies and information. In order to achieve a compact solution, it is an advantage to assembly a plurality of contact rails to form one rail body, which then has a plurality of rail segments for the transfer of various electrical energies and information. Then in the different rail segments, different slip contacts, which are designed to fit the carriage units, engage in the carriage units. The use of slip rails and slip contacts makes possible a robust and reliable supply of the carriage units and makes it possible to move without problems the carriage units in the direction of the support rail longitudinal axis along the electrical supply interface.

In a preferred embodiment, the pneumatic supply interfaces of the support rails are designed respectively in the form of a groove which is closed by a linear sealing. Corresponding tap connect pieces of the carriage units interact with the linear sealing. In the case of the pneumatic supply interface as well, a rail-type interface is therefore also realised in this way. Along the groove, depending on the requirement, compressed air or vacuum is present to supply correspondingly the carriage units on the support rail. In a favourable embodiment, the linear sealing consists of two pressure tubes, which extend parallel to each other in the direction of the longitudinal axis of the groove. The two pressure tubes are thus adjacent to each other with their longitudinal sides and therefore they close the groove. The sealing effect can be adapted without problems to the respective requirements, in that the pressure level in the pressure tubes, which are filled e.g. with compressed air, is correspondingly changed. Thus by higher pressure in the pressure tubes, the sealing effect of the linear sealing can be increased and vice versa. A tap connect piece which fits with the carriage unit can then be introduced between the pressure tubes of the linear sealing, in order to take up compressed air present in the groove or the present vacuum supply. The tap connect pieces which are introduced are surrounded by the pressure tubes, so that the sealing effect remains around the tap position. The tap connect pieces can then be moved in the direction of the support rail longitudinal axis together with the carriage unit, in that it moves between the two pressure tubes and is constantly surrounded by them. To obtain a compact design, it is an advantage to design the pneumatic supply interface so that compressed air supply or vacuum supply can be provided optionally at one single groove. If necessary, however, it is also possible to provide a plurality of grooves which extend parallel with each other in the support rail, in which respectively the desired pneumatic supply type, i.e. compressed air or vacuum, is made available separately. If necessary, other pneumatic fluids can be made available at the pneumatic supply interface as well. In addition, it is also possible in accordance with the invention to provide, by analogy with the pneumatic supply interface, an interface for the supply of a fluid to the carriage units. Such an interface could also be designed in the form of a groove with a linear sealing, in which then the corresponding tap connecting piece engages.

Preferably the electrical and pneumatic supply interfaces are arranged laterally on the support rail. The carriage units can then be disposed on the top of the support rail, and the mechanical guidance between the carriage unit and support rail can also be provided on the top of the support rail. The lateral arrangement of the supply interfaces, in addition, has the advantage that the supply interfaces are better protected against pollution, because shavings etc. which drop down during the processing of the workpiece, fall past the supply interfaces and in practice cannot accumulate there.

In particular, it is preferable to arrange the electrical supply interfaces on one side and the pneumatic supply interfaces on the other. This results in a clearly arranged guidance of the supply strands. But of course it is also possible to arrange the electrical and pneumatic supply interfaces at other positions of the support rail, e.g. on the top of it or on the bottom. Naturally it is also possible to place all the electrical and pneumatic supply interfaces of a support rail on one side of the support rail and in this way to assemble the supply interfaces on one side of the support rail.

Preferably the carriage units are equipped with coupling arms, which are designed for engagement in the supply interfaces. Thus the carriage unit can be arranged on the top of the support rail, and the coupling arms provide the connection to the supply interfaces in the support rail. When the supply interfaces are disposed laterally on the support rail, the coupling arms expediently extend laterally from the carriage unit downwards, and have in the zone of their free ends, fitting slip contacts and tap connect pieces, with which they engage in the supply interfaces. If the electrical supply interfaces are on one side of the support rail and the pneumatic supply interfaces are on the other side of the support layer, favourably on each side of the carriage unit, a coupling arm is formed, in which one coupling arm engages in the electrical supply interface, while the other coupling arm engages in the pneumatic supply interface. The coupling arms can e.g. be bracket shaped or designed in another suitable form. If the supply interfaces, e.g. are located on the bottom of the support rail, the coupling arms can correspondingly surround the support rail, in order to produce the connection between the carriage unit and the supply interfaces. An arrangement of the supply interfaces on the bottom of the carriage rail is particularly resistant to pollution.

In a preferred embodiment, the coupling arms can be moved out from the supply interfaces and/or moved into the supply interfaces. In this context, they can be coupled with respect to the support rail in the lateral direction with the supply interfaces or decoupled from them. In an advantageous embodiment the extraction and insertion of the coupling arms can be carried out automatically. Such automatic extraction and insertion of the coupling arms can e.g. be carried out by compressed air drive, hydraulic drive, electrical drive or in a comparable way. In connection with a corresponding guidance of the carriage unit on the support rail, which allows the carriage unit to be raised, after the extraction of the coupling arms, the carriage unit can be raised directly from the support rail and vice versa the carriage unit can be directly placed in a desired position on the support rail, and by subsequent insertion of the coupling arms, it can be coupled with the supply strands of the support rail.

Preferably, between the support rail and the carriage unit an air cushion guidance is provided. Thereby the tilting of the carriage unit is avoided on the supply rail, and the carriage unit can be moved with particularly little friction along the support rail, because only minor friction becomes effective on the supply interfaces.

In a favourable embodiment, the formation of the air cushion is carried out between the support rail and carriage unit by supply of compressed air from the carriage unit. Thus the air cushion is only provided at that carriage unit, which is to be moved next. Naturally with a plurality of carriage units located on a support rail, the air cushions for movement can be simultaneously provided. The air cushions are then always formed by the compressed air supply on the carriage side exactly where they are needed. Preferably the compressed air supply from the carriage unit can be switched over to vacuum suction. Thus at first an air cushion can be generated to move the carriage unit into a desired position along the support rail and then the compressed air supply can be switched over to vacuum suction, so that the carriage unit is sucked on to the support rail and is itself fixed on the support rail in the desired position.

However, it is also possible in accordance with the invention to arrange the compressed air supply for forming an air cushion on the side of the support rail, even if there it is naturally more directly exposed to pollution. In addition it is possible in accordance with the invention to secure the carriage units on the support rail in a desired position not by vacuum suction, but e.g. by mechanical clamping or comparable means. Furthermore, in accordance with the invention, instead of an air cushion guidance, linear guidance, roller guidance or a comparable guidance between the support rail and the carriage unit can also be provided.

Even when it is favourable to design the connection between the carriage unit and support rail so that the carriage units can be raised directly from the support rail in a direction transversely to the support rail longitudinal axis, it is also possible in accordance with the invention to provide guidance between the support rail and the carriage unit, in which the carriage units can respectively be drawn off from the support rail only in the longitudinal direction of the rail or can be moved on it. Instead of coupling arms which can be extracted and inserted, naturally in accordance with the invention a permanent engagement in the supply interfaces can also be provided.

Each carriage unit is equipped with its own drive aggregate and is therefore drivable independently. Preferably the drive aggregate is designed as an electric motor with a pinion, which engages in a toothed rack on the support rail side. The toothed rack extends along the support rail. Thus only a single toothed rack is needed for each support rail, on which all the carriage units positioned on the support rail then proceed. Each carriage unit can thus be driven indvidually by its electric motor. In addition, this design allows the carriage unit to be raised from the support rail or to be placed upon it, because then only the pinion has to be disengaged or engaged with the toothed rack, to decouple or couple the drive. Instead of a pinion/toothed rack drive, the drive can also be designed between the carriage unit and the support rail as a worm wheel/worm shaft drive, as a linear drive, as a pneumatic drive, e.g. with a cylinder without a piston rod, or in the form of another suitable drive.

Furthermore the carriage units have their own power and/or logic control modules. Thus each individual carriage unit can be controlled decentrally.

The support rails in accordance with the invention can be disposed both in the longitudinal direction as well as in the transverse direction of the processing machine. In a favourable embodiment, the support rails are arranged in the throughput direction of the processing machine, so that carriage units on the support rails can be used advantageously for the supply and removal of a workpiece.

Figure 2:
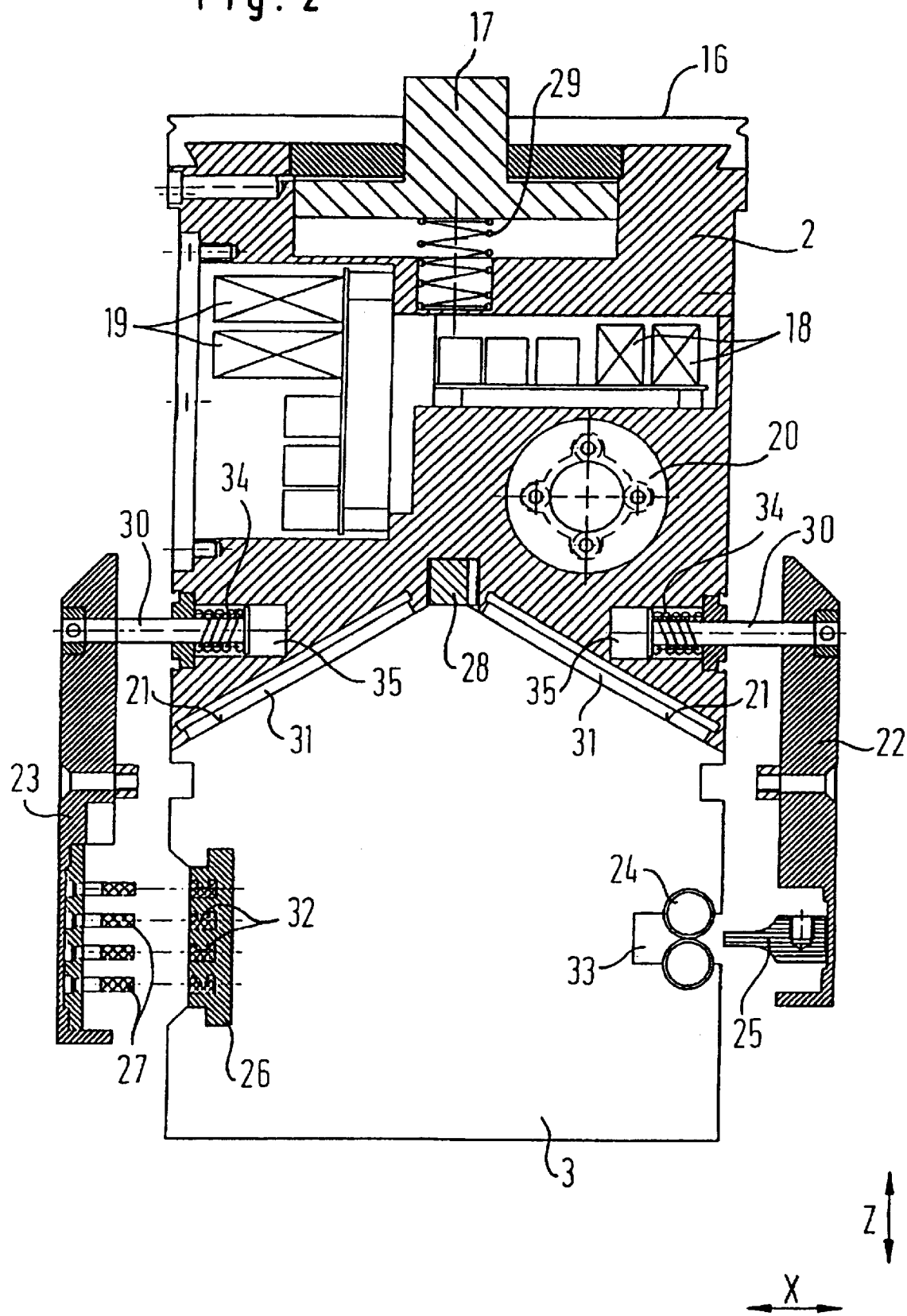

Below a preferred example of an embodiment of the processing machine in accordance with the invention is explained in more detail with reference to the enclosed drawings. They show:

FIG. 1 a schematic vertical sectional view of a support rail in accordance with the invention with a carriage unit placed on it in the coupled state;

FIG. 2 a schematic vertical sectional view of the support rail and carriage unit in FIG. 1 in decoupled state.

FIGS. 1 and 2 show a support rail 3, on which a carriage unit is placed in the form of a suction head 2. In the direction of the longitudinal axis of the support rail, which in the figures extends perpendicularly to the plane of the drawing, as a rule there is a plurality of such suction heads 2.

Support rail 3 has in the middle of its upper side a toothed rack 28, from which bearing surfaces 21 extend to both sides. The bearing surfaces 21 are at an angle to each other and in fact so that the bearing surfaces 21 respectively decline at an incline to one side. Toothed rack 28 extends in the direction of the longitudinal axis of the support rail over the entire length of support rail 3. In the figures on the righthand side, the teeth of the toothed rack are arranged, and below the teeth a space is formed so that pollution, e.g. falling shavings, drop through the teeth and can slide off the inclined bearing surfaces 21. As a result the toothed rack guidance remains functional.

In the side surfaces of support rail 3, there are integrally an electrical supply interface 26, 32 and a pneumatic supply interface 24, 33. The electrical supply interface which is in FIGS. 1 and 2 on the lefthand side of the support rail, comprises a slip rail body 26, which extends parallel to the longitudinal axis of the support rail over the length of support rail 3. In the slip rail body 26 there are e.g. four slip rail segments 32, from which electrical energy as well as electrical signals and information can be picked up. The slip rail body 26 is somewhat set back to the middle plane of the support rail, so that e.g. falling shavings can drop past along the side surface of the support rail to the exterior before the electrical interface, so that the latter is not polluted. In FIGS. 1 and 2 on the righthand side of the support rail, there is the pneumatic interface, on which optionally a vacuum supply or compressed air supply is made available. A groove 33 extends from one side into the support rail 3 and is closed to the exterior by a linear sealing 24. This linear sealing has two pressure hoses, which abut against each other with their longitudinal sides. Both groove 33 as well as the pressure hoses extend in the direction of the longitudinal axis of the support rail and extend over the length of support rail 3. The pressure level in the pressure hoses is variable so that the sealing effect can be adjusted as required. From the outside, by means of a tap connect piece 25 engagement can be carried out between the pressure hoses to take off the pneumatic supply. The pneumatic supply interface is also set back somewhat to the middle plane of the support rail, to avoid damage to the linear sealing.

Suction head 2 has a square base body, which is provided on the bottom with a bearing zone, which fits with the inclined bearing surfaces 21 and with the toothed rack 28 of support rail 3. On the bearing zone of suction head 2, recesses 31 are formed which fit the bearing surfaces 21. In these recesses 31, compressed air can be introduced from the suction head, so that between the suction head and the support rail an air cushion is built up, on which the suction head can slide in the longitudinal direction of the support rail. The compressed air supply can also be changed over to vacuum suction, so that the suction head in the zone of recesses 31 is sucked on to the bearing surfaces 21 of the support rail and is therefore itself fixed there.

In the suspended arrangement to the side, on the carriage unit two supply brackets 22, 23 are disposed, which produce the supply connection between the suction head and the supply interfaces on the side of the support rail. In the figures on the lefthand side, there is the supply bracket 23, on the lower end zone of which slip contacts 27 are arranged which fit the slip rail segments 32 on the sides of the support rail. In the figures on the righthand side, there is supply bracket 22, which has in its bottom end zone a tap connect piece 25 which is arranged for engagement between the pressure hoses of the linear sealing 24 and into the groove 33. In FIG. 1, the supply brackets 22, 23 are shown in that position in which they respectively engage in the associated supply interfaces of the support rail. Therefore suction head 2 is coupled with support rail 3 for supply.

In addition, the suction head has an electric motor 20, which drives a pinion (not shown) which engages in the toothed rack 28 of the support rail and thus allows the movement of the suction head in the longitudinal direction of the support rails on the air cushion which is formed between the suction head and support rail. Moreover in the suction head various control modules 18, 19 are housed, which are used for control of the electric drive energy as well as of the logic control of the suction head. On the top of it, the suction head is provided with a suction lining 16. Above in the middle of the suction head, a disk valve 17 is arranged, which can be activated against the force of a spring 29 by pressing it into the suction head. The disk valve 17 is only shown in simplified form and contains various individual components in its interior. The disk valve 17 is used to ensure that those suction heads which are not impacted by the workpiece to be clamped are switched off with respect to their vacuum suction on the suction lining 16. This prevents the vacuum system, which supplies centrally the various suction heads, from inducting the ambient atmosphere at a suction head which is not impacted, which would cause the vacuum to be interrupted. Only when the disk valve 17 is pressed is the vacuum suction released on the suction lining 16. The suction head 2 which is shown is designed as a double vacuum suction device, because it is both itself fixed by vacuum suction on the relevant support rail 3, as well as fixing a workpiece placed on it by vacuum suction on the suction lining 16.

As shown in FIG. 2, the supply brackets 22, 23 are connected by holder bolts 30 to the base body of the suction head. By means of springs 34, the holder bolts 30 are charged with a force in the direction of the suction head, i.e. in the direction of the middle plane of the support rail. Thus supply brackets 22, 23, as shown in FIG. 1, are held by the springs 34 automatically in engagement with the supply interfaces 26, 33. By charging chambers 35 with compressed air, as shown in FIG. 2, the holder bolts 30 and therefore supply brackets (22, 23) are moved out in a lateral direction, i.e. out of engagement with the supply interfaces 26, 33. The pressure which takes effect outwardly to the compressed air in chambers 35 on the holder bolts is greater than the return force which brings the springs 34 back to the holder bolts in the direction of the interior. The extraction and insertion of the supply brackets can also be carried out automatically controlled by compressed air, in that for the extraction process compressed air is introduced into the chambers 35 and the compressed air is withdrawn therefrom for the insertion process.

In the state as shown in FIG. 2, a suction head 2 can be withdrawn in the vertical direction upwardly from the support rail 3 and/or can be deposited on the support rail in the reverse direction.

What is claimed is:

1. A processing machine comprising one or more processing positions substantially in a joint plane, in particular for panel-shaped workpieces made of wood or wood materials,
   at least one processing unit which can be moved in three axes perpendicular to each other (X, Y and Z axes) over the machining positions,
   a number of support rails having a length on which carriage units are arranged to be movable in the plane of the machining positions, and
   one or more aggregates on the carriage units, wherein
      the support rails have respectively electrical and pneumatic supply interfaces for the carriage units in which the supply interfaces extend linearly along the length of the support rail,
      the carriage units are equipped with their own drive aggregates for independent movement of the respective carriage unit, which respectively picks up its drive power via the electrical supply interface, and
      the carriage units have their own power and/or logic control modules for the control of the electrical drive power and/or the logic control of the aggregates on the carriage units.

2. A processing machine in accordance with claim 1, wherein the electrical supply interfaces of the support rails comprise slip rails which interact with slip contacts of the carriage units.

3. A processing machine in accordance with claim 1, wherein the pneumatic supply interfaces of the support rails are designed respectively in the form of a groove which is closed by a linear sealing, which interacts with tap connect pieces of the carriage units.

4. A processing machine in accordance with claim 1, wherein the electrical and pneumatic supply interfaces are arranged on a side of the support rail.

5. A processing machine in accordance with claim 4, wherein the electrical supply interfaces are disposed on one side and the pneumatic supply interfaces are on another side of the support rail.

6. A processing machine in accordance with claim 1 wherein the carriage units are equipped with coupling arms for engagement in the supply interfaces.

7. A processing machine in accordance with claim 6, wherein the coupling arms can be moved with respect to the support rail in the lateral direction outwardly and inwardly for decoupling and coupling with the supply interfaces.

8. A processing machine in accordance with claim 7, wherein the outward and inward movement of the coupling arms can be actuated automatically.

9. A processing machine in accordance with claim 1 comprising, an air cushion guide between support rail and carriage unit.

10. A processing machine in accordance with claim 9, wherein compressed air supply is performed from the carriage unit to form an air cushion.

11. A processing machine in accordance with claim 10, wherein the compressed air supply from the carriage unit can be switched over to vacuum suction.

12. A processing machine in accordance with claim 1, wherein the drive aggregate comprises an electric motor with a pinion, which engages in a toothed rack, which is mounted on the support rail and extends along the longitudinal extension thereof.

* * * * *